United States Patent [19]

Haraguchi et al.

[11] Patent Number: 4,733,265

[45] Date of Patent: Mar. 22, 1988

[54] DATA RETAINING APPARATUS FOR A CAMERA

[75] Inventors: Shosuke Haraguchi; Yoshihiko Aihara, both of Yokohama, Japan

[73] Assignee: Canon Kabushiki Kaisha, Tokyo, Japan

[21] Appl. No.: 55,364

[22] Filed: May 29, 1987

[30] Foreign Application Priority Data

Jun. 13, 1986 [JP] Japan ............... 61-91128[U]

[51] Int. Cl.$^4$ ............................................. G03B 7/26
[52] U.S. Cl. ................................. 354/484; 354/412; 354/288
[58] Field of Search ............... 354/412, 484, 217, 288, 354/173.1, 173.11

[56] References Cited

U.S. PATENT DOCUMENTS

| | | | |
|---|---|---|---|
| 4,299,466 | 11/1981 | Harvey | 354/217 |
| 4,645,326 | 2/1987 | Kiuchi et al. | 354/484 |
| 4,662,736 | 5/1987 | Taniguchi et al. | 354/412 |
| 4,668,070 | 5/1987 | Wakabayashi | 354/484 |
| 4,671,636 | 6/1987 | Desormeaux | 354/173.1 |
| 4,676,621 | 6/1987 | Desormeaux | 354/173.1 |
| 4,678,303 | 7/1987 | Desormeaux | 354/173.11 |
| 4,687,307 | 8/1987 | Ohsawa | 354/484 |

FOREIGN PATENT DOCUMENTS 0158355 5/1983 Japan .
0178333 10/1983 Japan .
0061731 4/1985 Japan .

Primary Examiner—Russell E. Adams
Attorney, Agent, or Firm—Fitzpatrick, Cella, Harper & Scinto

[57] ABSTRACT

A data retention apparatus which protects against loss of data from the data processing circuits of a camera during replacement of the camera battery. A non-volatile memory, such as an $E^2$ PROM, is arranged to receive data from the data processing circuits when the camera's battery cover is opened. An operating member holds the camera battery against its contacts when the cover is opened so that data transfer can take place. Thereafter the operating member can be operated to release the battery.

6 Claims, 4 Drawing Figures

DATA RETAINING APPARATUS FOR A CAMERA

BACKGROUND OF THE INVENTION

1. Field of the Invention

The present invention relates to a data retaining device, and more particularly to a data retaining device for a camera.

2. Description of the Prior Art

In some cameras, calculation control has hitherto been performed electronically, with a battery being used as the power source. In this type of calculation control, various data are input to memories. However, conventional calculation control encounters the problem that, when the battery of the camera is replaced, the power supply to the memories is interrupted, and, as a result, information stored therein is lost. A known countermeasure that is taken against this problem involves a method which comprises providing an auxiliary battery as a back-up so as to keep the memories constantly supplied with power from the auxiliary power source. However, this is not a perfect method of retaining data because auxiliary batteries have limited lives and are expensive. In order to overcome these defects, a proposal has recently been made in Japanese Patent Laid-Open No. 61731/1985 concerning a data storage apparatus which is provided with a switch which may be turned off when a lock-button provided for opening and closing the cover of the battery receptacle is brought to its lock-releasing position, and in which data stored in the main memory is transferred in response to a signal indicating the off-condition of the switch to a non-volatile storage element such as an $E^2$ PROM into or from which data can be electrically written or read, or erased.

However, with the data storage apparatus disclosed in Japanese Patent Laid-Open No. 61731/1985, it is necessary to transfer data within a time interval of only about 25 ms (milliseconds) between the time at which the cover for the battery receptacle is released from its locking engagement and the time at which the cover is opened, thereby limiting the amount of data that can be transferred.

SUMMARY OF THE INVENTION

An object of the present invention is therefore to provide a data retention apparatus for a camera having a data processing circuit such as a microcomputer for processing data for photography, which apparatus is capable of preventing risk that data processed by the microcomputer and data set in a memory such as a RAM may be lost when the battery of the camera is being replaced.

In one aspect the present invention provides, in a camera having data processing circuits, a battery receptacle and a cover for the battery receptacle, a data retention apparatus which comprises a switch, a non-volatile memory circuit and an operation member. The switch is adapted to be switched from a first condition to a second condition by operation of opening the cover. The non-volatile memory circuit is connected to the switch to receive data from the data processing circuits when the switch is switched to its second condition. The operation member can be operated after the cover is opened; and until the operation member is operated, it maintains the supply of electrical power from the battery to the electrical processing circuits and to the non-volatile memory. Thus sufficient time is provided after removal of the battery cover to transfer a large amount of data to the non-volatile memory.

In another aspect the present invention provides, in a camera having data processing circuits, a battery receptacle and a cover for the battery receptacle, a data retention apparatus comprising operation means, a switch and a non-volatile memory circuit. The operation means is operable to permit removal of a battery from the battery receptacle by a first operation step and a second operation step. The switch is adapted to be switched from a first condition to a second condition in response to the first operation step. The non-volatile memory circuit is arranged to receive data from the data processing circuits upon the switching of the switch to its second condition. Thus in the first operation step of the operation means the switch is switched to its second condition and data from the data processing circuits is transferred to the non-volatile memory. Then in the second operation step of the operation means the battery is removed from the battery receptacle.

Other objects of the present invention will become more apparent from the following description of an embodiment with reference to the accompanying drawings.

DESCRIPTION OF THE PREFERRED EMBODIMENT

Figure 1:
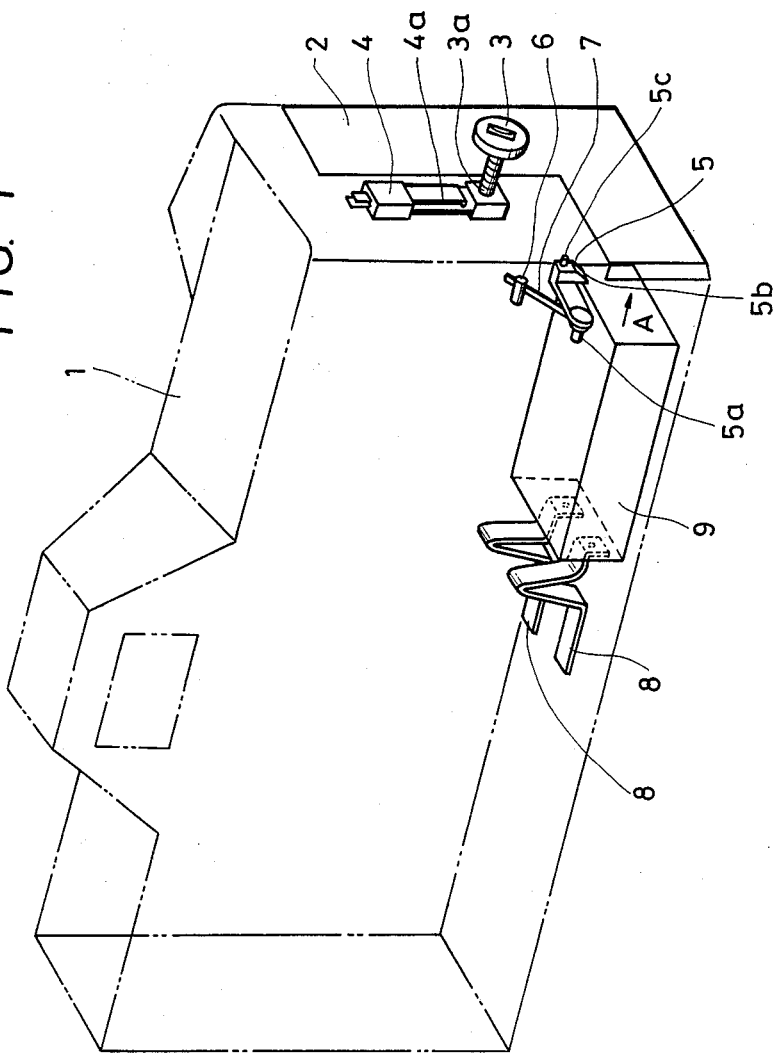
FIG. 1 is a perspective view of a camera (shown in phantom outline) having a data retention apparatus (shown in solid outline) in accordance with the present invention.

FIG. 1 shows an embodiment of the present invention in which an apparatus in accordance with the present invention is applied to a single-lens reflex camera. A single-lens reflex camera 1 (shown in phantom outline) has a battery cover 2 and a screw 3 provided for engaging and disengaging the battery cover 2. The battery cover 2 is disengageably secured to a battery receptacle of the main body of the camera 1 by the screw 3. When the screw 3 holds the battery cover 2 closed as shown in FIG. 1, an end 3a of the screw 3 presses against a contact piece 4a of a switch 4 provided within the main body of the camera 1 and holds it away from another contact piece 4b, thereby to keep the switch 4 in an open or turned-off condition. The screw 3 is threaded into a screw receptacle of the main body of the camera through a hole formed in the battery cover 2.

A check lever 5 is provided within the main body of the camera 1. This check lever 5 has a normal position, as shown in FIG. 1, at which the lever 5 acts to prevent a battery 9 from immediately springing out of the battery receptacle in the direction indicated by the arrow A shown in FIG. 1 by the urging force of spring-like battery contact pieces 8 when the battery cover 2 is opened from the main body. The check lever 5 is also rotatable in a counterclockwise direction to a retracted position. The check lever 5 is urged in a clockwise direction by a spring 7 provided between the lever 5 and a fixed pin 6 within the main body. The spring 7 is supported on a shaft 5a in the main body. The check lever 5 also has a tapered portion 5b which allows automatic rotation of the lever 5 when the battery 9 is being inserted, and a handling portion 5c by which the lever 5 may be rotated in the counterclockwise direction when the battery 9 is to be removed. When the lever 5 is rotated clockwise by the urging force of the spring 7, the rotation of the lever 5 is limited such that the tapered portion 5b is stopped by a stopper (not shown) at a position which is slightly lower than that shown in FIG. 1. In addition, the arrangement of the lever 5 is such that, when the battery 9 is being inserted, the tapered portion 5b is urged by the battery and is rotated upward, i.e. counterclockwise, thereby allowing the battery to be inserted.

Figure 2:
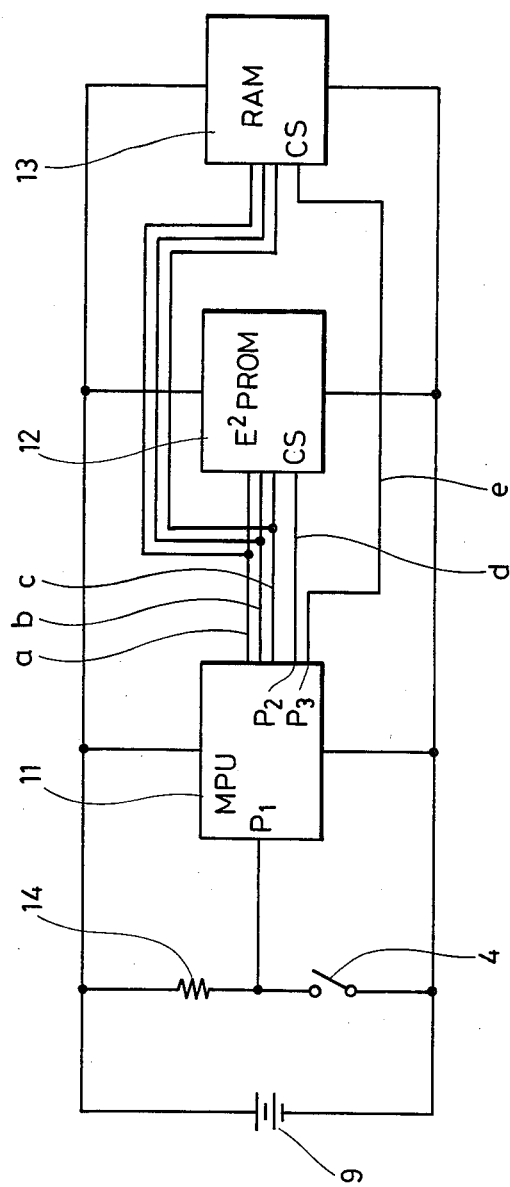
FIG. 2 is a block and circuit diagram showing a circuit used in the camera and data retention apparatus of FIG. 1.

FIG. 2 is a diagram showing the circuit of the single-lens reflex camera constructed as described above. The circuit includes an electrically controlling and computing means such as a microcomputer 11 (hereinafter referred to as "MPU"), a non-volatile storage means 12 into or from which data can be electrically written or read, or erased (hereinafter referred to as "$E^2$ PROM"), a storage means 13 into or from which data can be written or read (hereinafter referred to as "RAM"), a pull-up resistor 14, the switch 4 shown in FIG. 1 which is actuated by the operation of opening the battery cover, and the battery 9 also shown in FIG. 1 which serves as the power source and is replaceable. The circuit further includes input-output ports P1, P2, and P3, BUS lines a, b, and c, and lines d and e for chip-selecting signals.

The apparatus in accordance with the present invention is constructed as described above. In normal operation, the single-lens reflex camera associated with the apparatus is operated and controlled by using the battery as the power source and by causing the $E^2$ PROM 12 and the RAM 13 to operate by receiving commands from the MPU 11 and chip-selecting signals from the input-output ports P2 and P3.

When it is necessary to replace the battery, the screw 3 which is provided for engaging and disengaging the battery cover 2 is unscrewed, thus turning on the switch 4, and a signal from the thus turned on switch 4 is input to the input-output port P1 of the MPU 11. Upon receipt of this input signal, the MPU 11 outputs chip-selecting signals from the input-output ports P2 and P3, thereby effecting writing of data stored in the RAM 13 into the $E^2$ PROM 12.

In this operation of replacing the battery, however, the arrangement of the apparatus of the invention is such that the battery 9 can not be removed merely by removing the battery cover 2. Instead, the battery 9 can be removed only when the operator rotates the check lever 5 in the counterclockwise direction against the force of the spring 7. This allows the spring-like contact pieces 8 to urge the battery out of the receptacle.

By virtue of the addition of this operation of rotating the check lever 5, the period during which the data is transferred to the $E^2$ PROM can be lengthened to as much as or more than 100 ms, thus enabling an increase in the amount of data that can be transferred.

Figure 3:
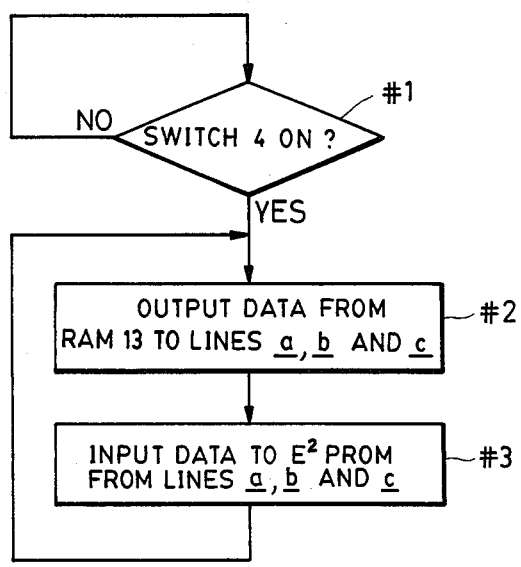
FIGS. 3 and 4 are program flow charts showing different parts of the program stored in an MPU 11 shown in FIG. 2.

FIG. 3 shows a data-transfer program stored in the MPU 11, in accordance with which the data is transferred. In this program, when the on-condition of the switch 4 is detected in step #1, the data stored in the RAM 13 is output, in step 2, to the BUS lines a, b, and c, and the data on the BUS lines is then input to and thus transferred to the $E^2$ PROM 12 in step #3. By executing these steps, the transfer of data to the $E^2$ PROM 12 is performed during the time interval extending from the moment at which the switch 4 is turned on to the moment at which the check lever 5 is operated.

Figure 4:
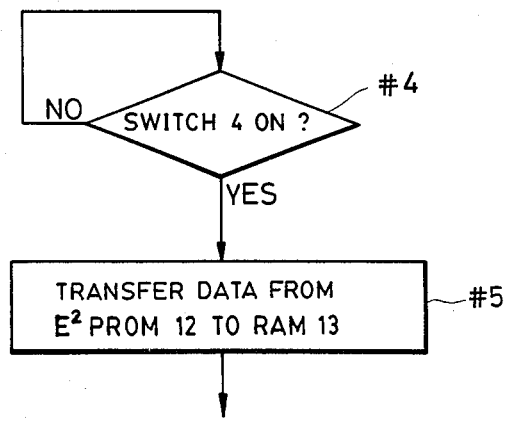

FIG. 4 shows a program for returning the data to the memory after the battery has been replaced. When the switch 4 is turned on after the battery has been replaced with a new battery and after power supply from the new battery has started, the data which has been transferred to the memory 12 is transferred again to the RAM 13 in steps #4 and #5, thereby restoring the condition of the data to that before the battery was replaced.

As described above, the data retention apparatus in accordance with the present invention allows a sufficient time period for the data stored in the MPU to be written into the $E^2$ PROM without the need for adding a special circuit, thereby enabling positive retention of data even if it is large in amout. The apparatus of the present invention is also capable of preventing the battery from suddenly springing out of the battery receptacle even when the battery cover is carelessly removed.

What is claimed is:

1. In a camera having data processing circuits, a battery receptacle and a cover for the battery receptacle, a data retention apparatus comprising:
    (a) a switch adapted to be switched from a first condition to a second condition by the operation of opening the cover for the battery receptacle;
    (b) a non-volatile memory circuit connected to said switch to receive data from said data processing circuits in said camera upon the switching of said switch to said second condition; and
    (c) an operation member which can be operated after the operation of opening said cover to release a battery from said receptacle, said operation member maintaining the supply of electrical power from said battery to said data processing circuits and to said non-volatile memory circuit until said operation member is operated.

2. A data retention apparatus as claimed in claim 1, wherein said operation member in its non-operated condition holds said battery at a connected position at which the terminals of said battery are in contact with power supply contact pieces provided in said battery receptacle, and wherein said operation member is shiftable to its operated condition to release said battery from being held at said connected position.

3. A data retention apparatus as claimed in claim 1 or claim 2, including a screw member engaging said cover with said battery receptacle to close said battery receptacle, said switch being engageable by said screw member such that said switch is in said first condition when said cover closes said battery receptacle and is switched to said second condition by operating said screw member to release said cover and open said battery receptacle.

4. A data retention apparatus as claimed in claim 1, wherein said data processing circuits comprise a microcomputer, and said non-volatile memory comprises an $E^2$ PROM.

5. In a camera having data processing circuits, a battery receptacle and a cover for the battery receptacle, a data retention apparatus comprising:
    (a) operation means operable for permitting removal of a battery from said battery receptacle, by a first operation step and a subsequent second operation step;

(b) a switch adapted to be switched from a first condition to a second condition in response to said first operation step; and (c) a non-volatile memory circuit arranged to receive data from said data processing circuits upon the switching of said switch to said second condition.

6. A data retention apparatus as claimed in claim 5, including holding means for holding a battery in contact with power supply terminals of said camera until said second operation step has been performed.

* * * * *

UNITED STATES PATENT AND TRADEMARK OFFICE
CERTIFICATE OF CORRECTION

PATENT NO. : 4,733,265

DATED : March 22, 1988

INVENTOR(S) : SHOSUKE HARAGUCHI, ET AL.

It is certified that error appears in the above-identified patent and that said Letters Patent is hereby corrected as shown below:

IN THE REFERENCES CITED AT [56]

"Desormeaux" (three occurrences) should read --Malloy Desormeaux--.

IN THE ABSTRACT AT [57]

Line 7, "it s" should read --its--.

COLUMN 2

Line 34, "FIG. 1 and;" should read --FIG 1; and--.

COLUMN 3

Line 67, "step 2," should read --step #2,--.

COLUMN 4

Line 20, "amout." should read --amount.--.

Signed and Sealed this

Twenty-third Day of May, 1989

Attest:

DONALD J. QUIGG

Attesting Officer

Commissioner of Patents and Trademarks